(12) United States Patent
Kiyosawa et al.

(10) Patent No.: US 10,253,863 B2
(45) Date of Patent: Apr. 9, 2019

(54) DUAL-TYPE STRAIN WAVE GEARING

(71) Applicant: Harmonic Drive Systems Inc., Shinagawa-ku, Tokyo (JP)

(72) Inventors: Yoshihide Kiyosawa, Azumino (JP); Jun Handa, Azumino (JP); XinYue Zhang, Azumino (JP); Noboru Takizawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 283 days.

(21) Appl. No.: 15/327,841

(22) PCT Filed: Jul. 3, 2015

(86) PCT No.: PCT/JP2015/069247
§ 371 (c)(1),
(2) Date: Jan. 20, 2017

(87) PCT Pub. No.: WO2016/013383
PCT Pub. Date: Jan. 28, 2016

(65) Prior Publication Data
US 2017/0211678 A1    Jul. 27, 2017

(30) Foreign Application Priority Data
Jul. 23, 2014  (JP) .............................. 2014-149375

(51) Int. Cl.
*F16H 49/00* (2006.01)
*F16H 1/32* (2006.01)

(52) U.S. Cl.
CPC ............. *F16H 49/001* (2013.01); *F16H 1/32* (2013.01); *F16H 2049/003* (2013.01)

(58) Field of Classification Search
CPC .......... F16H 49/001; F16H 1/32; F16H 55/12; F16H 2049/003
See application file for complete search history.

(56) References Cited

U.S. PATENT DOCUMENTS 2,930,254 A * 3/1960 Walton .................. F16H 49/001 74/640
4,776,708 A * 10/1988 Carlson ................. F16H 49/001 384/447

(Continued)

FOREIGN PATENT DOCUMENTS

JP        64-79448 A    3/1989
JP       1-91151 U     6/1989
(Continued)

OTHER PUBLICATIONS

International Search Report (PCT/ISA/210) dated Oct. 6, 2015, by the Japanese Patent Office as the International Searching Authority for International Application No. PCT/JP2015/069247.

*Primary Examiner* — Zakaria Elahmadi

(74) *Attorney, Agent, or Firm* — Buchanan Ingersoll & Rooney PC

(57) ABSTRACT

An externally toothed gear of a dual-type strain wave gearing is provided with first and second external teeth having different teeth numbers. The first and second external teeth are flexed by a wave generator by the same flexing amount, into an ellipsoidal shape. The tooth depth of tooth profiles of the first external teeth having a low teeth number is smaller than the tooth depth of tooth profiles of the second external teeth having a high teeth number. A dual-type strain wave gearing can be achieved with which the first and second external teeth having different teeth numbers can be suitably flexed to form excellent meshing states with respective internally toothed gears.

11 Claims, 5 Drawing Sheets

(56) References Cited

U.S. PATENT DOCUMENTS

| | | | |
|---|---|---|---|
| 4,974,470 A | 12/1990 | Ishikawa et al. | |
| 5,918,508 A * | 7/1999 | Ishikawa | F16H 55/0833 |
| | | | 475/180 |
| 7,530,292 B2 * | 5/2009 | Ishikawa | F16H 55/0833 |
| | | | 74/640 |
| 8,661,939 B2 * | 3/2014 | Ishikawa | F16H 55/0833 |
| | | | 74/462 |
| 9,435,418 B2 * | 9/2016 | Hoshina | F16C 19/44 |
| 9,470,301 B2 * | 10/2016 | Kuo | F16H 49/001 |
| 10,006,534 B2 * | 6/2018 | Murayama | F16H 49/001 |
| 2005/0059524 A1 * | 3/2005 | Hori | F16H 1/32 |
| | | | 475/180 |
| 2007/0022838 A1 * | 2/2007 | Ishikawa | F16H 55/0833 |
| | | | 74/640 |
| 2008/0173130 A1 | 7/2008 | Zhang et al. | |
| 2009/0139358 A1 * | 6/2009 | Ishikawa | F16H 55/0833 |
| | | | 74/461 |
| 2011/0088496 A1 * | 4/2011 | Cho | F16H 49/001 |
| | | | 74/411 |
| 2012/0304791 A1 | 12/2012 | Ishikawa | |
| 2013/0045827 A1 * | 2/2013 | Kobayashi | F16H 1/32 |
| | | | 475/149 |

FOREIGN PATENT DOCUMENTS

| | | |
|---|---|---|
| JP | 2-275147 A | 11/1990 |
| JP | 2008-180259 A | 8/2008 |
| JP | 2011-112214 A | 6/2011 |
| JP | 2012-251588 A | 12/2012 |
| JP | 2013-119919 A | 6/2013 |
| JP | 2013-194836 A | 9/2013 |

\* cited by examiner

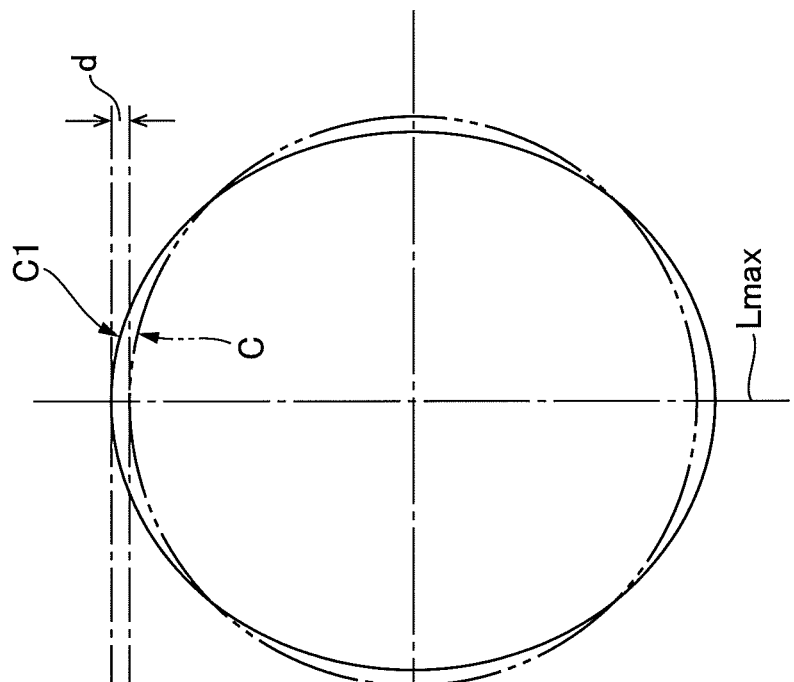
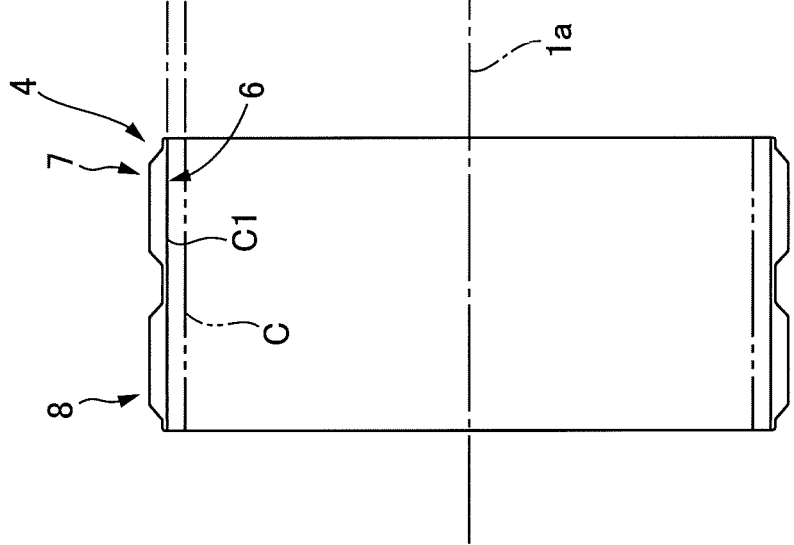

DUAL-TYPE STRAIN WAVE GEARING

TECHNICAL FIELD

The present invention relates to a strain wave gearing which has a pair of internally toothed gears, a cylindrical externally toothed gear capable of flexing in a radial direction, and a wave generator.

BACKGROUND ART

Strain wave gearings having cylindrical externally toothed gears are typically provided with a stationary-side internally toothed gear secured so as not to rotate, a wave generator that is a rotation-inputting element, a drive-side internally toothed gear that is a reduced-rotation-outputting element, and a cylindrical externally toothed gear capable of flexing in the radial direction and meshing with the stationary-side internally toothed gear and drive-side internally toothed gear. In typical strain wave gearings, the externally toothed gear is caused to flex into an ellipsoidal shape, the ellipsoidally flexed externally toothed gear meshing with the stationary-side and drive-side internally toothed gears at both end positions along the major axis of the ellipsoidal shape.

Patent Documents 1 and 4 disclose typical strain wave gearings in which the number of teeth of the stationary-side internally toothed gear is two greater than that of the externally toothed gear, and the number of teeth of the drive-side internally toothed gear is equal to that of the externally toothed gear. In Patent Document 1, the external teeth of the externally toothed gear are bisected at the tooth-trace-direction central portion thereof, one of the external-tooth portions being capable of meshing with the stationary-side internally toothed gear, and the other of the external-tooth portions being capable of meshing with the drive-side internally toothed gear. Patent Document 4 indicates that the rim wall thickness of the externally toothed gear dramatically affects the tooth bottom fatigue strength of the externally toothed gear.

In the strain wave gearings disclosed in Patent Documents 1 and 4, when the wave generator rotates, the externally toothed gear rotates more slowly at a speed ratio corresponding to the difference in the number of teeth with respect to the stationary-side internally toothed gear. The reduced rotation of the externally toothed gear is outputted from the drive-side internally toothed gear, which rotates integrally with the externally toothed gear.

Patent Document 2 discloses a strain wave gearing in which the number of teeth of the stationary-side internally toothed gear is two greater than that of the externally toothed gear, and the number of teeth of the drive-side internally toothed gear is two less than that of the externally toothed gear. In this strain wave gearing, when the wave generator rotates, the externally toothed gear rotates more slowly at a speed ratio corresponding to the difference in the number of teeth with respect to the stationary-side internally toothed gear. The rotation of the externally toothed gear is increased at a speed ratio corresponding to the difference in number of teeth between the externally toothed gear and the drive-side internally toothed gear, and is outputted from the drive-side internally toothed gear. The rotation outputted from the drive-side internally toothed gear is reduced at a speed ratio of less than 50 in relation to the rotation inputted to the wave generator.

Patent Documents 2 and 3 disclose strain wave gearings having wave generators that have two rows of ball bearings. This type of wave generator is configured from a rigid plug having an ellipsoidally contoured outer-peripheral surface, and two rows of ball bearings fitted to the outer-peripheral surface. The flexible externally toothed gear is pressed radially outward by the two major-axis end portions of the outer-peripheral surfaces of the ellipsoidally flexed outer races of the ball bearings, and the meshing of the flexible externally toothed gear with respect to the first and second rigid internally toothed gears is sustained.

PRIOR ART DOCUMENTS

Patent Documents

Patent Document 1: JP-A 2011-112214
Patent Document 2: JP-A 02-275147
Patent Document 3: JP-A 01-91151
Patent Document 4: 2008-180259

SUMMARY OF THE INVENTION

Problems to be Solved by the Invention

It is considered that in the externally toothed gear used herein, first teeth capable of meshing with one first internally toothed gear and second teeth capable of meshing with another second internally toothed gear are formed in the outer-peripheral surface of a radially flexible cylindrical body, the second teeth differing in number from the first teeth. Adopting such a configuration makes it possible to reduce or increase the rotational speed between the first external teeth and a first internally toothed gear, and to reduce or increase the rotational speed between the second external teeth and a second internally toothed gear, in a similar manner as in the strain wave gearing disclosed in Patent Document 2. Accordingly, it is possible to realize a strain wave gearing having a gear ratio of less than 50. Additionally, this configuration enables a strain wave gearing having a speed ratio of less than 50 to be designed with a greater degree of freedom than in the strain wave gearing disclosed in Patent Document 2.

In the present specification, a strain wave gearing that has an externally toothed gear in which first and second external teeth differing in number are formed in the outer-peripheral surface of a flexible cylindrical body is referred to as a "dual-type strain wave gearing."

In a dual-type strain wave gearing, first external teeth and second external teeth of an externally toothed gear are formed in the outer-peripheral surface of a shared cylindrical body, and the tooth bottom rim parts of the first and second external teeth are connected to each other. When the cylindrical body is caused by the wave generator to flex in an ellipsoidal shape, the first and second external teeth, which differ in number, respectively mesh with separate internally toothed gears.

In cases when the externally toothed gear is caused by the wave generator to flex in an ellipsoidal shape, the first and second external teeth formed in the externally toothed gear flex by the same amount in the radial direction. The first and second external teeth differ in terms of module as well as number. The amount by which the first external teeth are flexed to be capable of satisfactorily meshing with internal teeth of the first internally toothed gear and the amount by which the second external teeth are flexed to be capable of satisfactorily meshing with internal teeth of the second internally toothed gear differ from each other.

Therefore, even when the external teeth on one side can satisfactorily mesh with internal teeth, the degree of meshing of the external teeth on the other side with respect to internal teeth is either insufficient or excessive. When the degree of meshing of the external teeth with respect to the internal teeth is insufficient, the load capacity of the strain wave gearing and the transmission torque capacity decrease. Conversely, when the degree of meshing of the external teeth with respect to the internal teeth is excessive, the teeth on both sides interfere with each other, and the wear resistance thereof decreases. When the meshing states of the first and second external teeth with respect to the internal teeth differ, the balance of tooth bottom fatigue strength between the first and second external teeth deteriorates. Furthermore, there will be an increase in the range of fluctuation in the bearing-ball load distribution in first and second wave bearings in the wave generator, the wave bearings supporting the first and second external teeth, and a risk is presented that such increases could degrade the service life of the wave bearings.

No dual-type strain wave gearings have been proposed in the prior art. Therefore, no attention has been directed on the states of meshing with internally toothed gears when left and right first and second external teeth differing in number are flexed by the same amount, or on the adverse effects caused by such meshing states.

In view of the drawbacks described above, an object of the present invention is to provide a dual-type strain wave gearing in which the tooth profiles of first and second external teeth differing in number are suitably set such that it is possible to flex the first and second external teeth in a suitable manner and form satisfactory meshing states with respect to each of the internally toothed gears.

Means of Solving the Problems

In order to solve the problem described above, a dual-type strain wave gearing of the present invention is characterized by including:

a rigid first internally toothed gear in which first internal teeth are formed;

a rigid second internally toothed gear in which second internal teeth are formed, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in the outer-peripheral surface of a radially flexible cylindrical body, the second teeth differing in number from the first teeth, and the externally toothed gear being disposed coaxially inside the first and second internally toothed gears; and a wave generator which causes the externally toothed gear to flex in an ellipsoidal shape, causing the first external teeth to partially mesh with the first internal teeth and causing the second external teeth to partially mesh with the second internal teeth;

wherein a relationship $Zf1 = Zf2 - 2n$ is satisfied, where $Zf1$ is the number of first external teeth, $Zf2$ is the number of second external teeth, and $n$ is a positive integer;

wherein relationships $d < d_1$ $d > d_2$ are satisfied, where $d$ is the amount by which the first and second external teeth are radially flexed by the wave generator, $n_1$ and $n_2$ are positive integers, $m_1$ is the module of the first external teeth, $m_2$ is the module of the second external teeth, $2n_1$ is the difference in number of teeth between the first external teeth and the first internal teeth, and $2n_2$ is the difference in number of teeth between the second external teeth and the second internal teeth, and the theoretical value $d_1$ of the amount by which the first external teeth are radially flexed at major-axis positions and the theoretical value $d_2$ of the amount by which the second external teeth are radially flexed when the external teeth are flexed in an ellipsoidal shape are respectively represented by $d_1 = m_1 n_1$ and $d_2 = m_2 n_2$; and wherein a relationship $h1 > h2$ is established, where a first tooth depth $h1$ is the tooth depth of the tooth profile of the first external teeth, and a second tooth depth $h2$ is the tooth depth of the tooth profile of the second external teeth.

The first tooth depth $h1$ and the second tooth depth $h2$ preferably satisfy the relationship $1.0 < h2/h1 < 1.42$.

In the present invention, the first and second external teeth differing in number are caused to flex in an ellipsoidal shape so as to flex by the same amount, and are caused to mesh with the first and second internal teeth, respectively. With regard to the first external teeth, of which there are a smaller number, the amount of flexing is less than the theoretical value. Adopting a configuration in which the tooth depth of the first external teeth is greater than the tooth depth of the second external teeth makes it possible to eliminate any insufficiency in meshing between the first internal teeth and the first external teeth, which advance less during meshing, and to form a satisfactory meshing state. This also makes it possible to increase the number of teeth simultaneously meshing among the first external teeth and the first internal teeth.

Conversely, with regard to the second external teeth, of which there are a greater number, the amount of flexing is greater than the theoretical value. Adopting a configuration in which the tooth depth of the second external teeth is less than the tooth depth of the first external teeth makes it possible to eliminate interference between the second internal teeth and the second external teeth, which advance more during meshing, and to form a satisfactory meshing state.

As a result, it is possible to eliminate adverse effects such as: degradation of the meshing state between the first external teeth and first internal teeth and the meshing state between the second external teeth and the second internal teeth, which would reduce the load capacity of the strain wave gearing; worsening of the balance of tooth bottom fatigue strength between the first and second external teeth; and a decrease in wear resistance of the externally toothed gear and internally toothed gears. It is also possible to achieve an overall increase in ratcheting torque between the first and second external teeth and the first and second internal teeth. Furthermore, in the wave generator for supporting the first and second external teeth, it is possible to minimize the range of fluctuation in the bearing-ball load distribution in first and second wave bearings, and prevent any reduction in the service life of the wave bearings.

In the present invention, it is desirable that the relationship $$\alpha 1 > \alpha 2$$

is established, where a first average pressure angle α1 is the average of angles that are formed by a tooth-profile center line and a tooth-profile tangent line that extends to individual portions of the tooth land within a range of 50% of the total tooth depth in the tooth profile of the first external teeth, the range being centered about the pitch circle of the first external teeth, and where a second average pressure angle α2 is the average of angles that are formed by a tooth-profile center line of the second external teeth and a tooth-profile tangent line that extends to individual portions of the tooth land within a range of 50% of the total tooth depth in the tooth profile of the second external teeth, these range being centered about the pitch circle of the second external teeth.

The first and second average pressure angles α1, α2 preferably satisfy the relationship $$0.29\alpha 1 < \alpha 2 < 0.75\alpha 1.$$

In the present invention, the first and second external teeth differing in number are caused to flex in an ellipsoidal shape so as to flex by the same amount, and are caused to mesh with the first and second internal teeth, respectively. With regard to the first external teeth, of which there are a smaller number, the amount of flexing is less than the theoretical value. The tooth profile of the first external teeth is configured such that the tooth depth and the average pressure angle thereof are greater than those of the tooth profile of the second external teeth. This makes it possible to eliminate any insufficiency in meshing between the first internal teeth and the first external teeth, which advance less during meshing, and to form a satisfactory meshing state.

Conversely, with regard to the second external teeth, of which there are a greater number, the amount of flexing is greater than the theoretical value. The tooth profile of the second external teeth is configured such that the tooth depth and the average pressure angle thereof are less than those of the tooth profile of the first external teeth. This makes it possible to eliminate interference between the second internal teeth and the second external teeth, which advance more during meshing, and to form a satisfactory meshing state.

In the present invention, first and second rim wall thicknesses t(1), t(2) preferably satisfy the relationship $$t(1) < t(2),$$

where the first rim wall thickness t(1) is the rim wall thickness of the tooth bottom rim of the first external teeth, and the second rim wall thickness t(2) is the rim wall thickness of the tooth bottom rim of the second external teeth.

Thus, the rim wall thickness of the second external teeth, of which there are a greater number, is greater than the rim wall thickness of the other first external teeth, of which there are a smaller number. This makes it possible to maintain the balance of tooth bottom fatigue strength between the first and second external teeth.

Additionally, in the present invention, the wave generator preferably includes:

a rigid plug;

an ellipsoidally contoured outer-peripheral surface formed in the outer-peripheral surface of the plug;

a first wave bearing fitted to the outer-peripheral surface, the first wave bearing comprising ball bearings for supporting the first external teeth; and a second wave bearing fitted to the outer-peripheral surface, the second wave bearing comprising ball bearings for supporting the second external teeth.

In the dual-type strain wave gearing, the numerical relationship between each of the teeth can be established as described below. Specifically, the number of first external teeth differs from the number of first internal teeth, and the number of second external teeth differs from the number of second internal teeth.

Specifically, the number of first external teeth is less than the number of first internal teeth, and the number of first internal teeth and the number of second internal teeth are equal to each other.

Furthermore, the dual-type strain wave gearing is typically used as a gear reducer. In this case, for example, the wave generator is a rotation-inputting element, one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element.

BRIEF DESCRIPTION OF THE DRAWINGS

FIGS. 4(a) and 4(b) are diagrams showing the flexed state of the externally toothed gear shown in FIGS. 1(a) and 1(b)

MODE FOR CARRYING OUT THE INVENTION

An embodiment of a dual-type strain wave gearing to which the present invention is applied is described below with reference to the attached drawings.

[Overall Configuration of Strain Wave Gearing]

Figure 1:
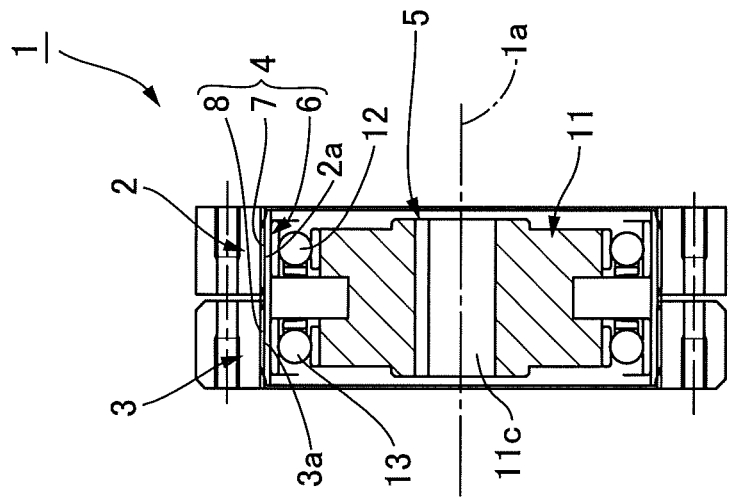
FIGS. 1(a) and 1(b) are an end-surface view and a longitudinal cross-sectional view of a dual-type strain wave gearing to which the present invention is applied.
Figure 2:
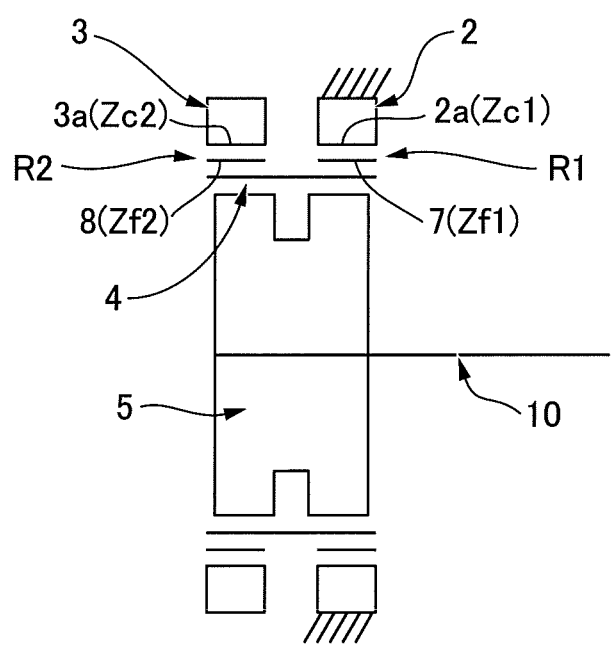
FIG. 2 is a schematic diagram of the dual-type strain wave gearing shown in FIGS. 1(a) and 1(b)

FIG. 1 is an end-surface view and a longitudinal cross-sectional view showing a dual-type strain wave gearing (referred to below simply as "strain wave gearing") according to an embodiment of the present invention, and FIG. 2 is a schematic diagram of the same. The strain wave gearing 1, which is used as, e.g., a gear reducer, has an annular rigid first internally toothed gear 2, an annular rigid second internally toothed gear 3, a cylindrical flexible externally toothed gear 4 comprising a radially flexible thin-walled elastic body, and an ellipsoidally contoured wave generator 5.

The first and second internally toothed gears 2, 3 are disposed so as to be coaxially aligned in parallel with each other, with a prescribed gap therebetween, along the direction of a central axis 1a. In the present example, the first internally toothed gear 2 is a stationary-side internally toothed gear secured so as not to rotate, the number of first internal teeth 2a thereof being indicated by Zc1. The second internally toothed gear 3 is a rotatably supported drive-side internally toothed gear, the number of second internal teeth 3a thereof being indicated by Zc2. The second internally toothed gear 3 is the reduced-rotation-outputting element of the strain wave gearing 1.

The cylindrical externally toothed gear 4 is disposed coaxially inside the first and second internally toothed gears 2, 3. The externally toothed gear 4 has a cylindrical body 6 that is a radially flexible thin-walled elastic body, first external teeth 7 and second external teeth 8 formed in the circular outer-peripheral surface of the cylindrical body 6, and a gap 9 (refer to FIG. 3) formed between the external teeth 7, 8 on either side, the gap 9 functioning as a cutter clearance area. The first external teeth 7 are formed on one side along the central axis 1a direction of the circular outer-peripheral surface of the cylindrical body 6, and the second external teeth 8 are formed on the other second-internal-teeth 3a side of the circular outer-peripheral surface. The first and second external teeth 7, 8 are formed such that the central-axis 1a direction is the tooth trace direction.

Specifically, the first external teeth 7 are formed on the side opposing the first internal teeth 2a, and are capable of meshing with the first internal teeth 2a, the number of first external teeth 7 being indicated by Zf1. The second external teeth 8 are formed on the side opposing the second internal teeth 3a, and are capable of meshing with the second internal teeth 3a, the number of second external teeth 8 being indicated by Zf2. The numbers Zf1, Zf2 of teeth are different from each other.

The wave generator 5 has an ellipsoidally contoured rigid plug 11, and a first wave bearing 12 and second wave bearing 13, the first and second wave bearings being fitted to the ellipsoidal outer-peripheral surface of the rigid plug 11. The first and second wave bearings 12, 13 are formed from ball bearings.

The wave generator 5 is inserted into the inner-peripheral surface of the cylindrical body 6 of the externally toothed gear 4, and causes the cylindrical body 6 to flex in an ellipsoidal shape. Therefore, the first and second external teeth 7, 8 are also flexed in an ellipsoidal shape. The ellipsoidally flexed externally toothed gear 4 meshes with the first and second internally toothed gears 2, 3 at both end positions along the major axis Lmax of the ellipsoidal shape. Specifically, the first external teeth 7 mesh with the first internal teeth 2a at both end positions along the major axis of the ellipsoidal shape, and the second external teeth 8 mesh with the second internal teeth 3a at both end positions along the major axis.

The wave generator 5 is the rotation-input element of the strain wave gearing 1. The rigid plug 11 of the wave generator 5 has a shaft hole 11c, in which an input rotation shaft 10 (refer to FIG. 2) is securely connected in a coaxial arrangement. For example, a motor output shaft may be securely connected in a coaxial arrangement in the shaft hole 11c. When the wave generator 5 rotates, the positions at which the first external teeth 7 of the externally toothed gear 4 and the stationary-side first internal teeth 2a mesh, and the positions at which the second external teeth of the externally toothed gear 4 and the drive-side second internal teeth 3a mesh, move along the circumferential direction.

The number Zf1 of first external teeth 7 and the number Zf2 of second external teeth 8 differ from each other; in the present example, the number Zf2 of second external teeth is greater. The number Zc1 of first internal teeth 2a and the number Zf1 of first external teeth 7 also differ from each other; in the present example, the number Zc1 of first internal teeth 2a is greater. The number Zc2 of second internal teeth 3a and the number Zf2 of second external teeth 8 differ from each other; in the present example, the number Zc2 of second internal teeth 3a is less.

In the present example, the externally toothed gear 4 is caused to flex in an ellipsoidal shape, and meshes with the internally toothed gears 2, 3 at two locations along the circumferential direction. Therefore, the difference between the number Zc1 of first internal teeth 2a and the number Zf1 of first external teeth 7 is $2n_1$, where $n_1$ is a positive integer. The difference between the number Zc2 of second internal teeth 3a and the number Zf2 of second external teeth 8 is $2n_2$, where $n_2$ is a positive integer.

$$Zc1=Zf1+2n_1$$

$$Zc2=Zf2-2n_2$$

In a specific example, the numbers of teeth are set as follows ($n_1=n_2=1$):

$$Zc1=62$$

$$Zf1=60$$

$$Zc2=62$$

$$Zf2=64$$

The speed ratio R1 between the first internally toothed gear 2 and the first external teeth 7, and the speed ratio R2 between the second internally toothed gear 3 and the second external teeth 8, are respectively defined as follows:

$$i1=1/R1=(Zf1-Zc1)/Zf1=(60-62)/60=-1/30$$

$$i2=1/R2=(Zf2-Zc2)/Zf2=(64-62)/64=1/32$$

Therefore, R1=−30, and R2=32.

The speed ratio R of the strain wave gearing 1 is represented by the following formula using the speed ratios R1, and R2. Thus, according to the present invention, a strain wave gearing having a dramatically low speed ratio (low reduction ratio) can be realized (a negative speed ratio indicates that output rotation progresses in the direction opposite that of input rotation).

$$R = (R1 \times R2 - R1)/(-R1 + R2)$$
$$= (-30 \times 32 + 30)/(30 + 32)$$
$$= -930/62$$
$$= -15$$

Thus, according to the strain wave gearing 1 in the present example, it is possible to obtain a speed ratio of less than 50, e.g., a speed ratio appreciably lower than 30. Additionally, unlike in the prior art, first external teeth 7 and second external teeth 8 that differ in number and module are formed as the external teeth of the externally toothed gear. Accordingly, there is a greater degree of freedom in the design for setting the speed ratio, and a strain wave gearing having a low speed ratio can be realized more easily than in the prior art.

[Configuration of Externally Toothed Gear]

Figure 3:
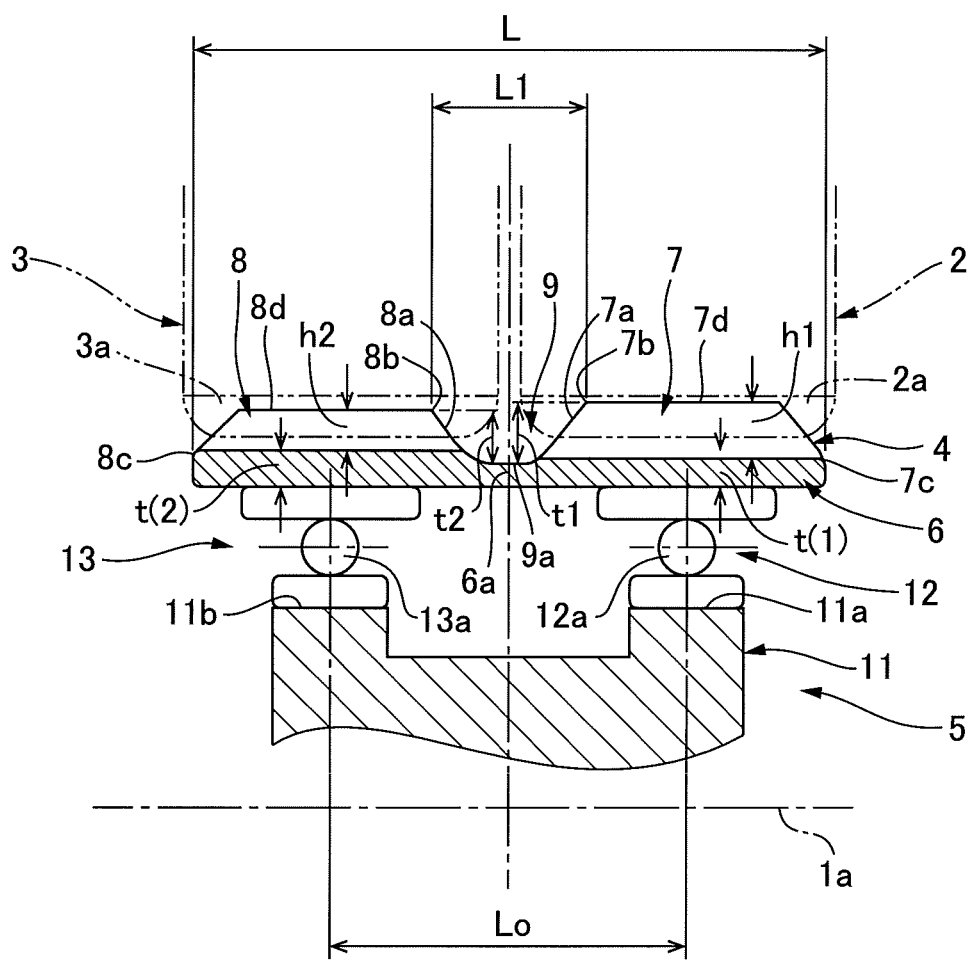
FIG. 3 is a partial enlarged cross-sectional view of the strain wave gearing shown in FIGS. 1(a) and 1(b)

FIG. 3 is a partial enlarged cross-sectional view of the strain wave gearing 1 shown in FIG. 1. The first and second external teeth 7, 8 formed in the externally toothed gear 4 shall now be described in detail with reference primarily to FIG. 3. In the present example, the tooth width of the first and second external teeth 7, 8 is substantially equal to that of the first and second internal teeth 2a, 3a, with which the first and second external teeth 7, 8 are capable of meshing. Therefore, the first external teeth 7 and second external teeth 8, which have the same tooth width, are formed symmetrically about a tooth-trace-direction central position 6a on the cylindrical body 6. In cases when the first internal teeth 2a and second internal teeth 3a differ in terms of tooth width, the first external teeth 7 and second external teeth 8 are also configured with different tooth widths in a corresponding manner.

The gap 9, which has a prescribed width along the tooth trace direction, is formed between the first and second external teeth 7, 8. The gap 9 functions as a cutter clearance area for tooth-cutting cutters used for cutting the first and second external teeth 7, 8.

(Rim Wall Thickness of First and Second External Teeth)

The rim wall thickness of the tooth bottom rim of the first external teeth 7 and second external teeth 8 is set as follows. The second rim wall thickness t(2) of the second external teeth 8, of which there are a greater number, is set so as to be greater than the first rim wall thickness t(1) of the first external teeth 7, of which there are a smaller number, where the first rim wall thickness t(1) is the rim wall thickness of the first external teeth 7, and the second rim wall thickness t(2) is the rim wall thickness of the second external teeth 8.

$$t(1) < t(2)$$

(Amount by which First and Second External Teeth are Flexed)

The first and second external teeth 7, 8 of the externally toothed gear 4 in the present example are both caused to flex in an ellipsoidal shape by the wave generator 5 having the two rows of wave bearings 12, 13. $m_1$ is the module of the first external teeth 7, and $m_2$ is the module of the second external teeth 8. $2n_1$ is the difference in number between the first external teeth 7 and the first internal teeth 2a, and $2n_2$ is the difference in number between the second external teeth 8 and the second internal teeth 3a. Therefore, the theoretical value $d_1$ of the amount by which the first external teeth 7 are radially flexed at major-axis positions Lmax and the theoretical value $d_2$ of the amount by which the second external teeth 8 are radially flexed when the external teeth are flexed in an ellipsoidal shape are respectively represented by the following.

$$d_1 = m_1 n_1$$

$$d_2 = m_2 n_2$$

In the case of the first and second external teeth 7, 8 that differ in number and are formed in the outer-peripheral surface of the same cylindrical body 6, the pitch circle diameters of the teeth on both sides are approximately equal. Accordingly, the theoretical value mn of the amount of radial flexing is normally less when the number of teeth is greater.

In the present example, the amounts by which the first and second external teeth 7, 8 are radially flexed by the wave generator 5 are both set to amount d. The amount d of radial flexing is represented by the following.

$$d < d_1$$

$$d > d_2$$

FIG. 4 is a diagram showing the flexed state of the externally toothed gear 4. In FIG. 4, the rim-neutral circle C is the circle passing through the thickness center of the cylindrical body (tooth bottom rim) 6 in a state in which the externally toothed gear 4 is perfectly circular prior to being flexed in an ellipsoidal shape. The rim-neutral circle C is deformed in an ellipsoidal shape due to the externally toothed gear 4 being flexed in an ellipsoidal shape. This deformed circle is referred to as the "ellipsoidal rim-neutral curve C1."

The amount d by which the externally toothed gear 4 is radially flexed is the difference between the radius of the major axis Lmax of the ellipsoidal rim-neutral curve C1 and the radius of the rim-neutral circle C. This amount d is represented by kmn, where m is the module of the externally toothed gear, 2n is the difference in number of teeth with respect to the internally toothed gears (n being a positive integer), and K is the deflection coefficient. The amount mn of radial flexing when K equals 1 is a value obtained by dividing the pitch circle diameter of the externally toothed gear by the reduction ratio from when the rigid internally toothed gear is secured; this is the theoretical value (amount of flexing at a standard deflection) of the amount of radial flexing.

In the present example, the state of flexing of the first external teeth 7, of which there are a smaller number, is set to an amount of flexing less than the theoretical value (an amount of flexing at a negative deflection angle where k<1), as described above. Conversely, the state of flexing of the second external teeth 8, of which there are a greater number, is set to an amount of flexing greater than the theoretical value (an amount of flexing at a positive deflection angle where k>1).

(Average Pressure Angles of First and Second External Teeth)

Figure 5B:
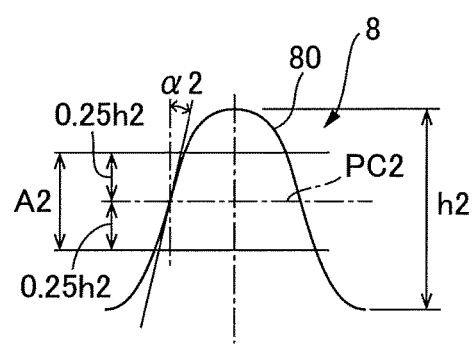
FIGS. 5(a) and 5(b) are a pair of graphs showing the tooth profiles of the first and second external teeth of the externally toothed gear shown in FIGS. 1(a) and 1(b).
Figure 5A:
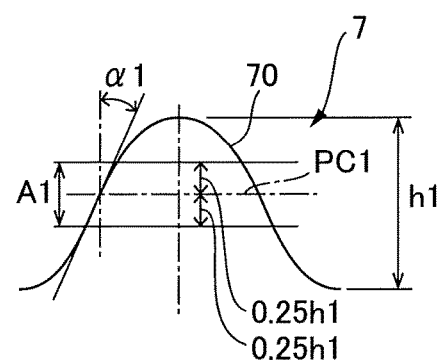

FIG. 5(a) is a graph showing the tooth profile that defines the first external teeth 7, and FIG. 5(b) is a graph showing the tooth profile that defines the second external teeth 5(b). The tooth profiles of the first and second external teeth 7, 8 in the present example are described with reference to these graphs.

First, the relationship between the pressure angles of the tooth profiles of the first and second external teeth 7, 8 shall be described. In FIG. 5(a), which shows one tooth profile 70 of the first external teeth 7, a principal tooth land region A1 is the tooth land region that defines a range of 50% of the total tooth depth h1 of the tooth profile 70, the principal tooth land region A1 being centered about the pitch circle PC1. The average of the angles that are formed by a tooth-profile center line of the tooth profile 70 and a tooth-profile tangent line that extends to individual portions of the principal tooth land region A1 is determined, this average being a first average pressure angle α1.

Similarly, in FIG. 5(b), which shows one tooth profile 80 of the second external teeth 8, a principal tooth land region A2 is the tooth land region that defines a range of 50% of the total tooth depth h2 of the tooth profile 80, the principal tooth land region A2 being centered about the pitch circle PC2. The average of angles that are formed by a tooth-profile center line of the tooth profile and a tooth-profile tangent line that extends to individual portions of the principal tooth land region A2 is determined, this average being a second average pressure angle α2.

In the present example, the first average pressure angle α1 of the first external teeth 7, of which there are a smaller number, is set so as to be greater than the second average pressure angel α2 of the second external teeth 8, of which there are a greater number (i.e., α1>α2). For example, the relationship between the first and second average pressure angles α1, α2 may be established as follows.

$$\alpha 2 \approx 0.31 \alpha 1$$

According to the experiments carried out by the inventors, it was confirmed that the relationship between the first and second average pressure angles α1, α2 is preferably established as follows.

$$0.29α1 < α2 < 0.75α1$$

(Tooth Depth of First and Second External Teeth)

The relationship between the tooth depths h1, h2 of the first and second external teeth 7, 8 is described next. In the present example, the first tooth depth h1, which is the tooth depth of the first external teeth 7, of which there are a smaller number, is established so as to be greater than the second tooth depth h2, which is the tooth depth of the second external teeth 8, of which there are a greater number (h1>h2). For example, the relationship between the first and second tooth depths h1, h2 may be established as follows.

$$h2 \approx 0.86h1$$

According to the experiments carried out by the inventors, it was confirmed that the first and second tooth depths h1, h2 preferably satisfy the following relationship.

$$h1 > h2$$

In the strain wave gearing 1 of the present example, the first and second external teeth 7, 8 differing in number are caused to flex in an ellipsoidal shape so as to flex by the same amount, and are caused to mesh with the first and second internal teeth 2a, 3a, respectively. With regard to the first external teeth 7, of which there are a smaller number, the amount of flexing is less than the theoretical value. The tooth profile 70 of the first external teeth 7 is configured such that the tooth depth h1 and the average pressure angle α1 thereof are greater than those of the tooth profile 80 of the second external teeth 8. This makes it possible to eliminate any insufficiency in meshing between the first internal teeth 2a and the first external teeth 7, which advance less during meshing, and to form a satisfactory meshing state.

Conversely, with regard to the second external teeth 8, of which there are a greater number, the amount of flexing is greater than the theoretical value. The tooth profile 80 of the second external teeth 8 is configured such that the tooth depth h2 and the average pressure angle α2 thereof are less than those of the tooth profile 70 of the first external teeth 7. This makes it possible to eliminate interference between the second internal teeth 3a and the second external teeth 8, which advance more during meshing, and to form a satisfactory meshing state.

As a result, it is possible to maintain both the meshing state of the first external teeth 7 and first internal teeth 2a and the meshing state of the second external teeth 8 and second internal teeth 3a in satisfactory states. This makes it possible to prevent any reduction in the load capacity of the strain wave gearing, maintain the balance of tooth bottom fatigue strength between the first and second external teeth 7, 8, and maintain the wear resistance of the externally toothed gear 4 and internally toothed gears 2, 3. It is also possible to achieve an overall increase in ratcheting torque between the first and second external teeth 7, 8 and the first and second internal teeth 2a, 3a. Furthermore, in the wave generator 5 for supporting the first and second external teeth 7, 8, it is possible to minimize the range of fluctuation in the bearing-ball load distribution in first and second wave bearings 12, 13, and to prevent any reduction in the service life of the wave bearings.

(Gap: Cutter Clearance Area)

The gap 9 formed between the first and second external teeth 7, is described next with reference to FIG. 3. As described previously, the gap 9 functions as a cutter clearance area for tooth-cutting cutters used for cutting the first and second external teeth 7, 8.

The gap 9 has a prescribed width along the tooth trace direction; the deepest part, which is the part of the gap 9 that is formed deepest along the tooth depth direction, is formed in the tooth-trace-direction central portion. In the present example, the deepest part 9a is a portion at which the tooth-trace-direction central portion is defined by a straight line extending parallel to the tooth trace direction, as viewed from the tooth-thickness direction. At the two tooth-trace-direction ends of the deepest part 9a, a concave arcuate curve that defines the tooth-trace-direction inner-end surface 7a of the first external teeth 7 and a concave arcuate curve that defines the tooth-trace-direction inner-end surface 8a of the second external teeth 8 are smoothly connected. It is also possible to adopt a configuration in which the deepest part 9a is defined by a concave curved surface and the two inner-end surfaces 7a, 8a are defined by inclined straight lines. It is furthermore possible to adopt a configuration in which the deepest part 9a is defined by a straight line and the two inner-end surfaces 7a, 8a are defined by inclined straight lines.

The tooth-trace-direction width of the gap 9 in the present example gradually increases from the deepest part 9a along the tooth depth direction. The maximum width L1 in the tooth trace direction is the distance, along the tooth trace direction, from the tooth-trace-direction inner end 7b of the addendum circle of the first external teeth 7 to the tooth-trace-direction inner end 8b of the addendum circle of the second external teeth 8.

The relationship $$0.1L < L1 < 0.3L$$

is established, where L is the width from the tooth-trace-direction outer end 7c of the first external teeth 7 to the tooth-trace-direction outer end 8c of the second external teeth 8, and L1 is the tooth-trace-direction maximum width of the gap 9.

The depth of the deepest part 9a of the gap 9 is set as follows. The relationships $$0.9h1 < t1 < 1.3h1 \text{ and}$$

$$0.9h2 < t2 < 1.3h2$$

are established, where h1 is the tooth depth of the first external teeth 7, h2 is the tooth depth of the second external teeth 8, t1 is the tooth-depth-direction depth from the top land 7d of the first external teeth 7 to the deepest part 9a, and t2 is the tooth-depth-direction depth from the top land 8d of the second external teeth 8 to the deepest part 9a.

In the externally toothed gear 4 of the dual-type strain wave gearing 1, the tooth-cutting cutters used for cutting the first and second external teeth 7, 8 are also different from each other. Therefore, the gap 9, which functions as a cutter clearance area, is formed in the tooth-trace-direction central portion of the externally toothed gear 4; i.e., between the first external teeth 7 and the second external teeth 8.

The manner in which the gap 9 is formed has a prominent effect on the tooth contact of the first external teeth 7 with respect to the first internal teeth 2a along the tooth trace direction, as well as the tooth land load distribution. The manner in which the gap 9 is formed similarly has a prominent effect on the tooth contact of the second external teeth 8 with respect to the second internal teeth 3a along the tooth trace direction, as well as the tooth land load distribution.

In view of these points, the maximum width L1 of the gap 9 is set within a range of 0.1-0.3 times the width L of the externally toothed gear 4, and the maximum depths t1, t2 are set within a range of 0.9-1.3 times the tooth depths h1, h2 of the first and second external teeth 7, 8, as described above. It was confirmed that forming the gap 9 in this manner makes it possible to maintain uniformity in the tooth-trace-direction tooth land load distributions of the first and second external teeth 7, 8, and to maintain a satisfactory state for the tooth contact of the first and second external teeth 7, 8 with respect to the first and second internal teeth 2a, 3a at each tooth-trace-direction position.

[Distance Between Bearing-Ball Centers in Wave Generator]

The distance between the bearing-ball centers of the first and second wave bearings 12, 13 are described next with reference to FIG. 3.

In the rigid plug 11 of the wave generator 5, an ellipsoidally contoured first outer-peripheral surface 11a of fixed width is formed on one central-axis-direction side, and an ellipsoidally contoured second outer-peripheral surface 11b of fixed width is formed on the other central-axis-direction side. The first outer-peripheral surface 11a and the second outer-peripheral surface 11b are ellipsoidal outer-peripheral surfaces having the same shape and the same phase.

The first wave bearing 12 is fitted to the first outer-peripheral surface 11a in a state of being flexed in an ellipsoidal shape, and the second wave bearing 13 is fitted to the second outer-peripheral surface 11b in a state of being flexed in an ellipsoidal shape. The first and second wave bearings 12, 13 are of the same size.

The bearing centers 12a, 13a of the first wave bearing 12 and second wave bearing 13 are located at positions that are equidistant, along the tooth width direction, from the tooth-trace-direction central position 6a on the externally toothed gear 4. The distance between bearing-ball centers is set so as to increase correspondingly with an increase in the maximum width L1 of the gap 9. Furthermore, the inter-ball-center distance Lo is set so as to reach a value within the range indicated by the following formula, Lo being the distance between bearing-ball centers.

$$0.35L < Lo < 0.7L$$

In the prior art, a wave generator having two rows of ball bearings is used in order to increase the area in which the externally toothed gear is supported. The two rows of ball bearings were arranged with respect to the tooth-width-direction central portion of the externally toothed gear, irrespective of the inter-ball-center distance.

In the present example, the inter-ball-center distance Lo between two rows of wave bearings 12, 13 is increased such that it is possible to increase rigidity for supporting first and second external teeth 7, 8 differing in number, and to improve the tooth contact of each of the external teeth 7, 8 with respect to internal teeth 2a, 3a at each tooth-trace-direction position. Specifically, as described above, a configuration is adopted in which the inter-ball-center distance Lo lengthens (increases) correspondingly with an increase in the tooth-trace-direction maximum length L1 of the gap 9, which is formed between the first and second external teeth 7, 8 and functions as a cutter clearance area. The range of increase of the inter-ball-center distance Lo is set to 0.35-0.7 times the width L of the externally toothed gear 4.

This makes it possible to arrange the first and second wave bearings 12, 13 such that the ball centers are positioned at suitable tooth-trace-direction positions with respect to each of the first and second external teeth 7, 8, in accordance with the width of the gap 9 that is formed. This makes it possible to reliably support the first and second external teeth 7, 8, using the first and second wave bearings 12, 13, at each tooth-trace-direction position of each of the first and second external teeth 7, 8 (i.e., to increase the supporting rigidity of the wave generator 5).

As a result, it is possible to improve the tooth contact of the first and second external teeth 7, 8 at each tooth-trace-direction position, and to increase the tooth bottom fatigue strength thereof. It is also possible to average the bearing-ball load distribution of each of the wave bearings 12, 13 of the wave generator 5, and to reduce the maximum load; therefore, the service life of the wave generator 5 can be improved.

[Other Embodiments]

In the example described above, the first internally toothed gear 2 is configured as a stationary-side internally toothed gear, and the second internally toothed gear 3 is configured as a drive-side internally toothed gear (reduced-rotation-outputting member). However, it is possible to instead configure the first internally toothed gear 2 as a drive-side internally toothed gear (reduced-rotation-outputting member), and configure the second internally toothed gear 3 as a stationary-side internally toothed gear.

The invention claimed is:

1. A strain wave gearing comprising:
   a rigid first internally toothed gear formed with first internal teeth;
   a rigid second internally toothed gear formed with second internal teeth, the second internally toothed gear being disposed so as to be coaxially aligned in parallel with the first internally toothed gear;
   a flexible externally toothed gear in which first external teeth capable of meshing with the first internal teeth and second external teeth capable of meshing with the second internal teeth are formed in an outer-peripheral surface of a radially flexible cylindrical body, the second teeth differing in number from the first teeth, and the externally toothed gear being disposed coaxially inside the first and second internally toothed gears; and
   a wave generator for flexing the externally toothed gear in an ellipsoidal shape to cause the first external teeth to partially mesh with the first internal teeth and to cause the second external teeth to partially mesh with the second internal teeth,
   wherein a relationship $$Zf1 = Zf2 - 2n$$

is satisfied, where Zf1 is a number of first external teeth, Zf2 is a number of second external teeth, and n is a positive integer;
      wherein amounts by which the first and second external teeth are radially flexed by the wave generator, respectively, are set to be a same radial flexing amount d, and the radial flexing amount d satisfies relationships $$d < d_1, \text{ and}$$

$$d > d_2,$$

where $m_1$ is a module of the first external teeth, $m_2$ is a module of the second external teeth,
      n1 and n2 are positive integers, $2n_1$ is a difference in number of teeth between the first external teeth and the first internal teeth, and $2n_2$ is a difference in number of teeth between the second external teeth and the second internal teeth, and $d_1$ is a theoretical value of an amount by which the first external teeth are radially flexed at major-axis positions and $d_2$ is a theoretical value of an amount by which the second external teeth are radially flexed when the external teeth are flexed in an ellipsoidal shape, the theoretical values $d_1$ and $d_2$ being respectively represented by $d_1 = m_1 n_1$ and $d_2 = m_2 n_2$; and wherein a relationship $h1 > h2$ is satisfied, where a first tooth depth h1 is a tooth depth of a tooth profile of the first external teeth, and a second tooth depth h2 is a tooth depth of a tooth profile of the second external teeth.

2. The strain wave gearing according to claim 1, wherein the first tooth depth h1 and the second tooth depth h2 satisfy a relationship $1.0 < h1/h2 < 1.42$.

3. The strain wave gearing according to claim 1, wherein a relationship $\alpha 1 < \alpha 2$ is satisfied, where a first average pressure angle $\alpha 1$ is an average of angles that are formed by a tooth-profile center line and tooth-profile tangent lines that extend to individual points in a tooth land within a range of 50% of a total tooth depth in a tooth profile of the first external teeth, the range being centered about a pitch circle of the first external teeth, and where a second average pressure angle $\alpha 2$ is an average of angles that are formed by a tooth-profile center line of the second external teeth and a tooth-profile tangent line that extends to individual points in a tooth land within a range of 50% of a total tooth depth in a tooth profile of the second external teeth, the range being centered about a pitch circle of the second external teeth.

4. The strain wave gearing according to claim 3, wherein the first and second average pressure angles $\alpha 1$, $\alpha 2$ satisfy a relationship $0.29\alpha 1 < \alpha 2 < 0.75\alpha 1$.

5. The strain wave gearing according to claim 1 wherein first and second rim wall thicknesses t(1) and t(2) satisfy a relationship $t(1) < t(2)$, where the first rim wall thickness t(1) is a rim wall thickness of a tooth bottom rim of the first external teeth, and the second rim wall thickness t(2) is a rim wall thickness of a tooth bottom rim of the second external teeth.

6. The strain wave gearing according to claim 1, wherein the wave generator has:
a rigid plug;
an ellipsoidally contoured outer-peripheral surface formed in an outer-peripheral surface of the plug;
a first wave bearing fitted to the outer-peripheral surface, the first wave bearing comprising ball bearings for supporting the first external teeth; and
a second wave bearing fitted to the outer-peripheral surface, the second wave bearing comprising ball bearings for supporting the second external teeth.

7. The strain wave gearing according to claim 1, wherein a gap is formed between a tooth-trace-direction inner-end surface of the first external teeth and a tooth-trace-direction inner-end surface of the second external teeth, the gap having a prescribed width along a tooth trace direction, and the gap having a tooth-depth-direction deepest part at a tooth-trace-direction central portion; a relationship $0.1L < L1 < 0.3L$ is satisfied, where L is a width from a tooth-trace-direction outer end of the first external teeth to a tooth-trace-direction outer end of the second external teeth, and L1 is a tooth-trace-direction maximum width of the gap; and
relationships $0.9h1 < t1 < 1.3h1$ and $0.9h2 < t2 < 1.3h2$ are satisfied, where h1 is a tooth depth of the first external teeth, h2 is a tooth depth of the second external teeth, t1 is ae tooth-depth-direction depth from a top land of the first external teeth to the deepest part, and t2 is a tooth-depth-direction depth from a top land of the second external teeth to the deepest part.

8. The strain wave gearing according to claim 7,
wherein the wave generator has a first wave bearing comprising a ball bearing for supporting the first external teeth, and a second wave bearing comprising a ball bearing for supporting the second external teeth; and
bearing-ball centers of the first wave bearing and the second wave bearing are located at positions that are equidistant, along the tooth width direction, from a tooth-trace-direction center of the gap; and
wherein, where an inter-ball-center distance Lo is a distance between the bearing-ball centers of the first and second wave bearings,
the inter-ball-distance is set so as to increase correspondingly with an increase in a maximum width L1 of the gap, and satisfies a relationship $0.35 < Lo < 0.7l$.

9. The strain wave gearing according to claim 1,
wherein the number of the first external teeth differs from a number of the first internal teeth, and
the number of second external teeth differs from a number of second internal teeth.

10. The strain wave gearing according to claim 1,
wherein the number of first external teeth is less than the number of first internal teeth, and
the number of first internal teeth and the number of second internal teeth are equal to each other.

11. The strain wave gearing according to claim 1,
wherein the wave generator is a rotation-inputting element,
either one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element.

* * * * *